May 20, 1969    V. L. BARR    3,445,120
WEDGE SEALING GASKET AND JOINT
Filed Aug. 20, 1964    Sheet 2 of 2
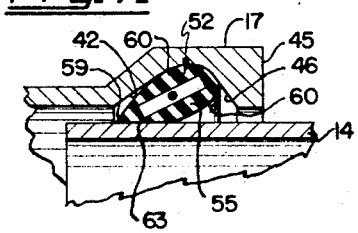
Fig. 7.
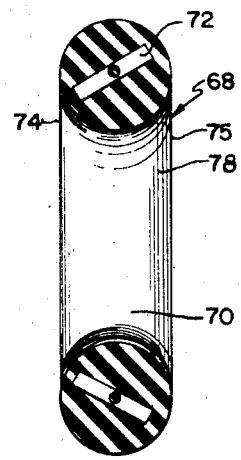
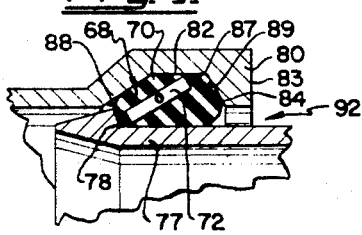
Fig. 9.
Fig. 8.
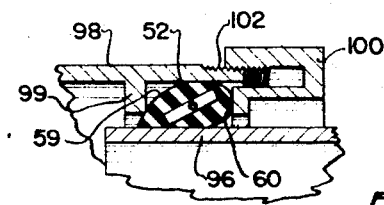
Fig. 10.
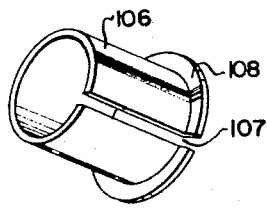
Fig. 11.
INVENTOR
VERNON L. BARR
BY
Fetherstonhaugh & Co.
ATTORNEYS

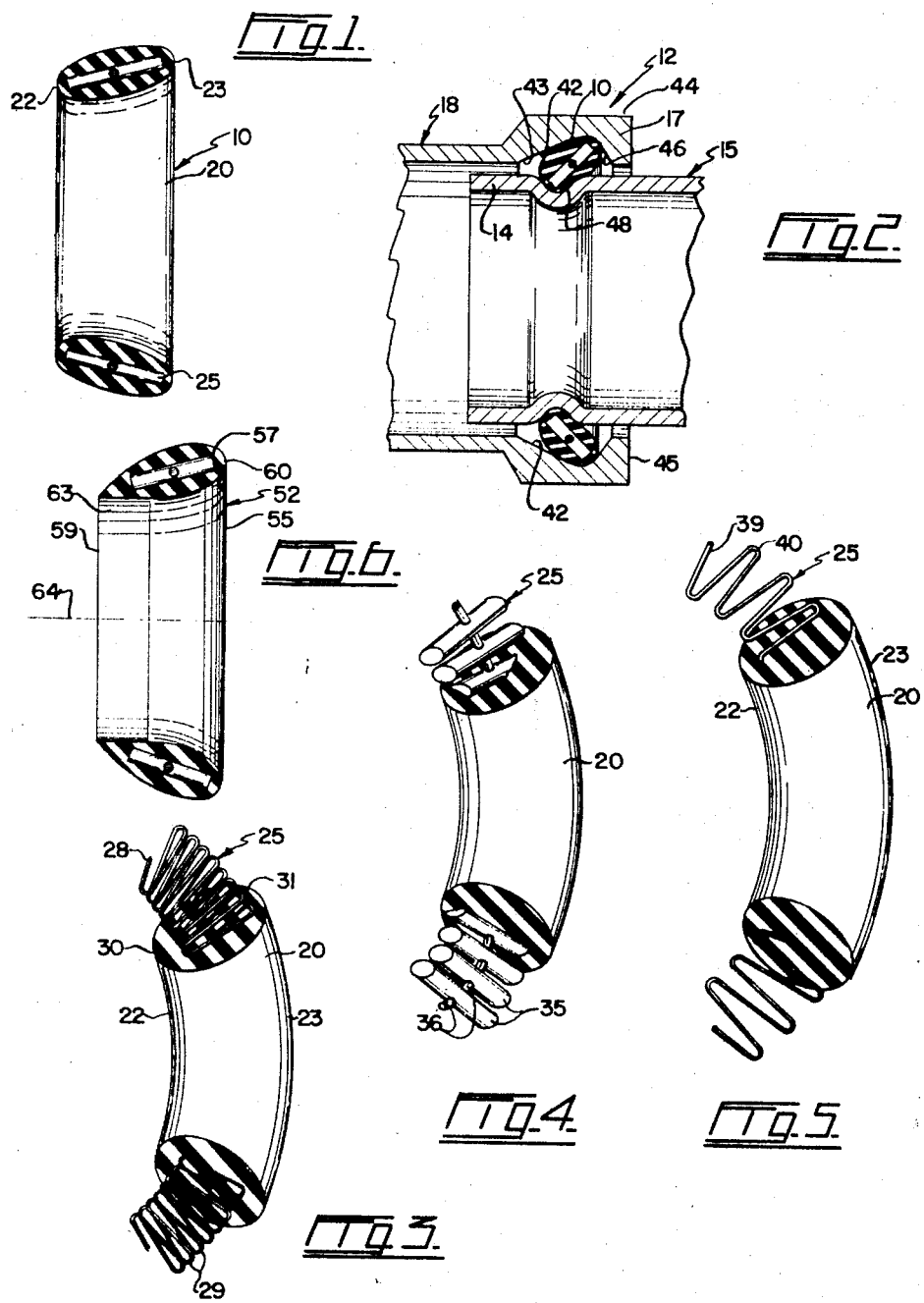

United States Patent Office 3,445,120
Patented May 20, 1969

3,445,120
WEDGE SEALING GASKET AND JOINT
Vernon L. Barr, 3382 W. 8th Ave., Vancouver,
British Columbia, Canada
Filed Aug. 20, 1964, Ser. No. 390,982
Int. Cl. F16j *15/02;* F16l *21/02*
U.S. Cl. 277—164                12 Claims This invention relates to wedge sealing gaskets and joints sealed thereby.

An object of the present invention is the provision of wedge sealing gaskets for diametrically spaced, concentric cylindrical objects, such as pipes.

Another object is the provision of a wedge sealed joint in pipes and similar objects.

The gaskets of the present invention are primarily designed to fit in the joint between a spigot or small end of one pipe and a larger bell end of another type, but it is to be understood that they may be used between the end of one pipe fitting into the end of a larger pipe, and the term "bell end" is intended to include such end of a larger diameter pipe. At least one of the pipe members which are joined together preferably has an annular groove or an annular shoulder into which or against which the sealing gasket fits, but the gasket may be held in operative position by a gland follower or thrust ring.

A gasket according to the present invention comprises a resilient annular band substantially in the form of a truncated hollow cone having inner and outer annular side edges, the outer side edge being of larger diameter than the inner side edge. Stiffening means is secured to the band throughout the length thereof and is adapted to provide rigidity transversely of the band between the edges thereof while allowing the band to expand and contract along each edge relative to the other edge. The inner side edge fits tightly around the spigot member, while the outer side edge bears against the inner surface of the bell end member. Means is associated with the bell member to bear against the outer edge of the gasket band, and as said band is inclined outwardly relative to the spigot member, any tendency for the spigot and bell members to separate in a longitudinal direction causes the band to wedge more tightly between these members. This happens because the stiffening means will not permit the band materially to compress in a transverse direction so that the two members are tightly locked together against movement which would tend to part them, and the space between these members is tightly filled by the gasket. The wedge sealing gasket is such that it can be placed inside the bell member and then the spigot moved inwardly of said member through the band, the inner edge of the band expanding at this time to permit the movement of the spigot, or the gasket may be placed on the spigot member, and the bell member moved over said spigot member and the band, at which time the outer edge of the band contracts to permit this movement.

The gaskets of the prior art for the same purpose have caused a great deal of difficulty due to bruising of the gaskets if the pipe members were not in substantially perfect alignment during assembly or if the spigot end of the pipe was not suitably bevelled. Another disadvantage of the prior gaskets was the fact that it was practically impossible to dismantle most of the joints once they were established without destroying the gasket. A split sleeve may easily be inserted into the present sealing gasket so that the spigot member can be withdrawn without damaging the gasket.

An advantage of this wedge sealing gasket is that each one can be used with spigots of several different outside diameters since the wedging action causes the gasket to fit tightly against the spigot member. The gasket centers the spigot, and there is very little danger of "cold flow" because of the stiffening means of the annular band. If internal pressure within the connected pipes has a tendency to separate these pipes in a longitudinal direction, the gasket will roll with the bell end, causing the inner edge of the band to grip the spigot more tightly. Thus, the greater the force tending to separate the pipes longitudinally, the greater the sealing and gripping effect of the gasket.

Several sealing gaskets and joints according to this invention are illustrated in the accompanying drawings, in which, FIGURE 1 is a cross section through one form of wedge sealing gasket, FIGURE 2 is a longitudinal section through a pipe joint with the gasket of FIGURE 1 therein, FIGURES 3 to 5 are similar views of sealing gaskets having alternative forms of stiffening means therein, FIGURE 6 is a cross section through an alternative form of sealing gasket, FIGURE 7 is a sectional view through a pipe joint with the gasket of FIGURE 6 therein, FIGURE 8 is a cross section through another alternative form of gasket, FIGURE 9 is a sectional view through a pipe joint with the gasket of FIGURE 8 therein, FIGURE 10 is an alternative form of pipe joint including the gasket of FIGURE 6, and FIGURE 11 is a perspective view of a split sleeve to be used in taking apart a pipe joint with a wedge sealing gasket therein.

Referring to FIGURES 1 and 2 of the drawings, 10 is one form of wedge sealing gasket according to the present invention adapted to be used in a joint 12 between the spigot end or member 14 of pipe 15 and the bell end or member 17 of pipe 18. Gasket 10 consists of an annular band 20 of substantially oval cross section and formed of suitable resilient material, such as rubber, rubber composition, resilient plastic, and the like. This band is in the form of a truncated hollow cone having an inner annular side edge 22 and an outer annular side edge 23. The diameter of outer side edge 23 is greater than that of inner side edge 22 so that band 20 is inclined inwardly cross sectionally from edge 23 to edge 22, as clearly shown in FIGURE 1. Gasket 10 must be able to expand and contract, and each of the side edges 22 and 23 must be able to expand and contract relative to the other side edge, and yet band 20 must be rigid in a transverse direction, that is, between the edges 22 and 23. Suitable stiffening means 25 is provided in band 20 for this purpose.

FIGURES 3 to 5 illustrate three gasket bands 20 with three different stiffening means 25 therein. In FIGURE 3, stiffening means 25 is formed of stiff wire 28 wound into a flat coil or spiral with the convolutions 29 thereof extending transversely of band 20. The convolutions 29 terminate short of band edges 22 and 23 so that there are narrow strips 31 and 32 of the material forming the band along the side edges of the flat coil. The convolutions of the wire coil are preferably embedded in the material of band 20. The wire coil 28 will expand longitudinally of band 20, but it is comparatively rigid transversely of said band. Although wire is preferably used for this coil, it is to be understood that other suitable material, such as plastics, may be used.

FIGURE 4 illustrates an alternative form of stiffening means 25 in band 20. This stiffening means comprises a plurality of short rods 35 embedded in the material of band 20 and extending transversely of said band, terminating short of edges 22 and 23 thereof. These rods may be formed of metal or other suitable material, such as plastics. If the rods are formed of a relatively rigid plastic, they may be connected together substantially midway between their ends by light strips 36 that keep the rods in proper spaced relationship during the formation of the gasket band.

FIGURE 5 illustrates still another alternative form of stiffening means 25. This stiffening means is made up of stiff wire 39 bent to zig zag back and forth across band 20 in a transverse direction. It is preferable that the curved ends 40 of this wire be spaced inwardly a little from the side edges 22 and 23 of the band.

Bell end 17 preferably has an annular groove 42 formed in its inner end. This groove preferably has an inclined bottom 43 which is inclined inwardly relative to the outer surface 44 of the bell member and away from the end 45 of said member. Groove 42 forms a shoulder 46 in said bell member at the end 45 thereof. Spigot 14 preferably has an annular groove 48 in the outer surface thereof which is opposed to groove 42 of the bell member.

In order to connect pipes 15 and 18 together, gasket 10 is placed in either groove 48 of spigot member 14 or groove 42 of bell member 17. In the former case, shoulder 46 of bell member 17 depresses the outer side edge 23 of band 20 inwardly as the bell member moves over spigot member 14, and in the latter case, spigot member 14 is moved into bell member 17 and it expands the inner side edge 22 of the body band so that the spigot member slides through the latter until said side edge 22 contracts into annular groove 48 of the spigot. As clearly seen from FIGURE 2, gasket 10 forms a wedge between adjacent surfaces of the bell member and the spigot member. If any force is applied which tends to separate pipes 15 and 18 in a longitudinal direction, band 20 will tend to roll, that is, its outer edge 23 will tend to swing away from spigot 14. As the stiffening means 25 is rigid in a direction transversely of band 20, the band cannot compress transversely so that it is more tightly wedged between the two members when there is a tendency of the two pipes to move in directions away from each other. The greater the pressure within these pipes tending to separate them, the greater is the wedging action so that the pipes are more tightly joined together and the seal between them becomes more effective.

FIGURE 6 illustrates an alternative form of wedge sealing gasket 52. This gasket is quite similar to gasket 10 and consists of a resilient band 55 of substantially oval cross section and in the form of a truncated hollow cone. This band has stiffening means 57 embedded therein throughout the length thereof adapted to provide rigidity transversely of the band between inner and outer edges 59 and 60. Stiffening means 57 may be any one of the stiffening means illustrated in FIGURES 3 to 5. The main difference between gaskets 52 and 10 is that the former includes a flat annular surface 63 at the inner side edge 59 and facing inwardly of the band. This flat annular surface 63 extends generally parallel to the longitudinal axis of band 52, said axis being indicated at 64 in FIGURE 6.

In FIGURE 7, bell member 17 is formed with the internal annular groove 42 spaced by shoulder 46 from the adjacent end 45 of said member. However, spigot 14 does not include the annular groove 48 shown in FIGURE 2. When gasket 52 is in position, its outer edge 60 fits in bell member groove 42, while the flat annular surface 63 of band 55 bears against the outer surface of spigot member 14. Gasket 52 fits tightly around spigot member 14, and any tendency of pipes 15 and 18 to part causes gasket 52 to rotate since the friction of flat surface 63 on the outer surface of spigot member 14 prevents the inner edge 59 of the gasket from moving along said member. As a result of this, the outer edge 60 of the gasket band swings outwardly, causing a wedging action.

FIGURE 8 illustrates still another form of wedge sealing gasket 68 comprising an annular band 70 which is substantially circular in cross section. Stiffening means 72 is provided in band 70. As the latter is circular in cross section, the annular stiffening means 72 is in the form of a truncated hollow cone, and the edges of this stiffening means are spaced inwardly a little from inner and outer edges 74 and 75 of band 70. Stiffening means 72 may be the same as any of the stiffening means illustrated in FIGURES 3 to 5.

In FIGURE 9, spigot end or member 77 is pressed outwardly near the end thereof to form an annular shoulder 78. The bell end or member 80 of another pipe is formed with an annular groove 82 in its inner surface spaced inwardly from the end 83 of the member to form a shoulder 84. Groove 82 has a bottom 87 extending substantially parallel to the outer surface of spigot member 17 with side walls 88 and 89 which are inclined from bottom 87 outwardly away from each other.

Gasket 68 is fitted in the joint 92 between spigot member 77 and bell member 80 in the same way as the previously-described sealing gaskets. The cross sectional diameter of band 70 is greater than the distance between the outer surface of spigot 77 and bottom 87 of groove 82 so that the band is deformed when in the joint, as clearly shown in FIGURE 9. However, stiffening means 72 is in the form of a truncated cone so that the inner side edge 74 of band 70 fits around spigot member 77 and bears against shoulder 78 while the outer side edge 75 of said band bears against groove bottom 87 and/or groove wall 88. Stiffening means 72 keeps band 70 rigid transversely thereof, that is, between side edges 74 and 75 so that any tendency of the spigot and bell members to separate acts on sealing gasket 68 in the manner described above in connection with gaskets 10 and 52.

FIGURE 10 illustrates an alternative use of the wedge sealing gaskets according to the present invention, gasket 52 being illustrated for this purpose. Pipe or spigot 96 is of smaller diameter than pipe of bell end 98 and fits within the latter. Pipe 98 has an annular stop ring or shoulder 99 projecting inwardly therefrom towards pipe 96 but spaced from the latter. Gasket 52, fitted around pipe 96, is pressed against stop ring 99 by a gland follower or thrust ring 100. This thrust ring is moved inwardly of member 98 in any desired manner. In this example, ring 100 is shaped to fit over the outer surface of member 98 and is connected thereto by threads 102 so that rotation of ring 100 moves it in or out relative to member 98.

When thrust ring 100 is moved inwardly, it presses outer edge 60 of gasket 52 outwardly against the inner surface of member 98, while stop ring 99, bearing against the inner edge 59 of the gasket prevents said inner edge from moving along pipe member 96. Gasket 52 now acts in the manner described above. In addition to this, as outer edge 60 rises, the angle of the gasket in cross section increases relative to pipe 96 and the gasket acts as a lever due to its transverse rigidity. As the angle increases, the force applied is increasingly magnified in proportion to the thrust ring.

FIGURE 11 illustrates a device which makes it possible to separate two members sealed with a wedge sealing gasket of the present invention without injuring said gasket. This device consists of a cylindrical sleeve 106 split longitudinally thereof at 107 and, preferably, having a collar 108 radiating from one end thereof. The inside diameter of sleeve 106 is slightly larger than the outside diameter of the inner pipe member of the joint.

When it is desired to separate the pipe members, sleeve 106 is opened along its split 107 and placed on the inner pipe member near the end of the outer pipe member. Then the sleeve is moved along the inner pipe member until it engages the portion of the wedge sealing gasket extending around the inner member. Further movement of the sleeve causes the inner side edge of the gasket to swing outwardly sufficient to permit the sleeve to be moved therebeneath. It will be noted in FIGURES 2, 7 and 9 that the groove in the outer pipe member is larger than the gasket so that this expansion of the inner side edge thereof can take place. It is now possible to draw the inner pipe member out of sleeve 106. The sleeve can now be contracted and withdrawn from the gasket, and the latter can then easily be removed from within the outer pipe member.

What I claim as my invention is:

1. Wedge sealing apparatus for a pipe joint comprising a resilient annular band, and stiffening means secured to the band throughout the length thereof and extending in cross section transversely of the band at a wedge angle to the axis of the band, said stiffening means being rigid in said transverse direction and allowing the inner circumference of the entire band to expand and contract in a radial direction.

2. Wedge sealing apparatus as claimed in claim 1 in which said stiffening means is substantially in the form of a hollow truncated cone having inner and outer annular side edges, said outer side edge being larger in diameter than the inner side edge, and each edge is able to expand and contract relative to the other edge.

3. Wedge sealing apparatus as claimed in claim 1 in which the band is substantially oval in cross section.

4. Wedge sealing apparatus as claimed in claim 1 in which the band is substantially round in cross section.

5. Wedge sealing apparatus as claimed in claim 1 in which the band is substantially oval in cross section and has a flat annular surface at the inner side edge facing inwardly of the band and extending generally parallel to the longitudinal axis of the band.

6. Wedge sealing apparatus as claimed in claim 1 in which the stiffening means is formed of stiff wire-like material wound into a flat coil with the convolutions of the coil extending transversely of the band.

7. Wedge sealing apparatus as claimed in claim 1 in which the stiffening means is formed of stiff thin material zig-zagging back and forth across the band.

8. Wedge sealing apparatus as claimed in claim 1 in which the stiffening means comprises stiff members embedded in and extending transversely of the band, said members being spaced from each other annularly, around the said axis of said band.

9. Wedge sealing apparatus for a pipe joint comprising a resilient annular band substantially in the form of a truncated hollow cone having inner and outer annular side edges, said outer side edge being of larger diameter than the inner side edge, and stiffening means embedded in the band throughout the length thereof and extending in cross section between said inner and outer edges at a wedge agle to the axis of the band, said stiffening means being secured between the band inner and outer edges and allowing the band to expand and contract along each edge relative to the other of said edges, said stiffening means terminating short of the inner and outer side edges of the band.

10. Wedge sealing apparatus for a pipe joint comprising a spigot within and diametrically spaced from a bell end, the outer surface of the spigot and the inner surface of the bell end being formed with opposed grooves, a wedge sealing gasket in the space between the spigot and the bell end and fitting in said opposed grooves; said gasket comprising a resilient annular band fitting tightly around the spigot, and stiffening means secured to the band throughout the length thereof and extending in cross section transversely of the band to inner and outer side edges and generally at a wedge angle relative to said opposing surfaces, said stiffening means being rigid in said transverse direction between the opposing surfaces and allowing the band to expand and contract in a radial direction, said outer edge being able to expand and contract relative to the inner edge, and said band at said outer edge of the stiffening means tending to expand when said spigot and bell end move longitudinally away from each other to cause the band to wedge therebetween and resist such movement.

11. Wedge sealing apparatus for a pipe joint comprising a spigot within and diametrically spaced from a bell end, said spigot and said bell end having opposed shoulders within the space therebetween, a wedge sealing gasket in the space between the spigot and the bell end fitting between and engaging said opposed shoulders; said gasket comprising a resilient annular band fitting tightly around the spigot, and stiffening means secured to the band throughout the length thereof and extending in cross section transversely of the band to inner and outer side edges and generally at a wedge angle relative to said opposing surfaces, said stiffening means being rigid in said transverse direction between the opposing surfaces and allowing the band to expand and contract in a radial direction, said outer edge being able to expand and contract relative to the inner edge, and said band at said outer edge of the stiffening means tending to expand when said spigot and bell end move longitudinally away from each other to cause the band to wedge therebetween and resist such movement.

12. Wedge sealing apparatus for a pipe joint comprising a spigot within and diametrically spaced from a bell end, a fixed shoulder in the space between the spigot and the bell end and surrounding the spigot, a movable thrust ring surrounding the spigot and opposed to the fixed shoulder, means for moving the thrust ring towards and away from the fixed shoulder, a wedge sealing gasket between and engaging the shoulder and thrust ring; said gasket comprising a resilient annular band fitting tightly around the spigot, and stiffening means secured to the band throughout the length thereof and extending in cross section transversely of the band to inner and outer side edges and generally at a wedge angle relative to said opposing surfaces, said stiffening means being rigid in said transverse direction between the opposing surfaces and being adapted to allow the band to expand and contract in a radial direction, said outer edge being able to expand and contract relative to the inner edge, and said band at said outer edge of the stiffening means tending to expand when said spigot and bell end move longitudinally away from each other to cause the band to wedge therebetween and resist such movement.

References Cited

UNITED STATES PATENTS

| 1,721,325 | 7/1929 | Wilson | 277—205 |
| 2,145,189 | 1/1939 | Nathan et al. | 277—237 |
| 2,325,556 | 7/1943 | Taylor et al. | 277—235 |
| 2,529,098 | 11/1950 | Noll | 277—205 |
| 2,893,058 | 7/1959 | Wurtz et al. | 277—235 X |
| 3,241,846 | 3/1966 | Peickii | 285—340 |

FOREIGN PATENTS

| 1,222,665 | 1/1960 | France. |
| 1,573 | 8/1908 | Great Britain. |
| 26,835 | 10/1905 | Great Britain. |

LAVERNE D. GEIGER, *Primary Examiner.*

D. MASSENBERG, *Assistant Examiner.*

U.S. Cl. X.R.

277—235, 207.